L. A. HUFSCHMIDT.
INDEX AND MEMORANDUM PAD HOLDER.
APPLICATION FILED JUNE 12, 1919.
1,347,222.
Patented July 20, 1920.
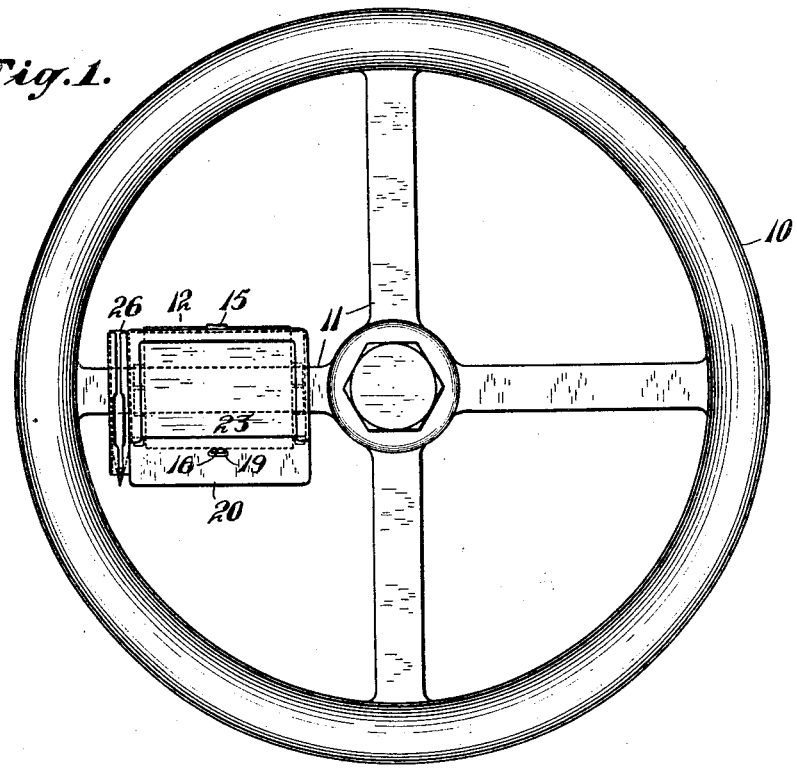
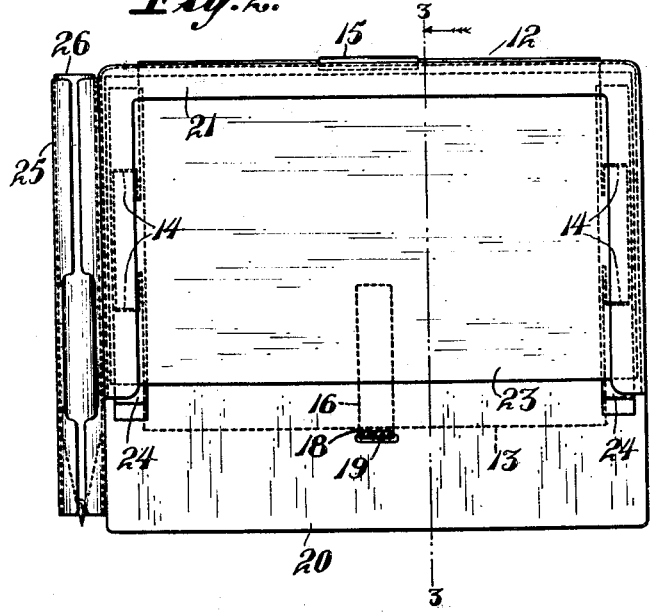
INVENTOR
Louis A. Hufschmidt
BY Strong & Townsend
ATTORNEYS

UNITED STATES PATENT OFFICE.

LOUIS A. HUFSCHMIDT, OF SAN FRANCISCO, CALIFORNIA.

INDEX AND MEMORANDUM PAD HOLDER.

1,347,222.　　　　Specification of Letters Patent.　　Patented July 20, 1920.

Application filed June 12, 1919.　Serial No. 303,653.

*To all whom it may concern:*

Be it known that I, LOUIS A. HUFSCHMIDT, a citizen of the United States, residing at the city and county of San Francisco and State of California, have invented new and useful Improvements in Index and Memorandum Pad Holders, of which the following is a specification.

This invention relates to a holder and particularly pertains to such a device adapted to receive index and memorandum pads.

It is the principal object of the present invention to provide a holder for pads which holder is especially adapted to be mounted upon the steering wheel of an automobile and to secure index and memoranda sheets in a convenient writing position for the driver of the vehicle. The holder being further provided with means for reversing it, and alternately disclosing index or memoranda pads.

The present invention contemplates the use of a body plate adapted to be permanently secured to the spoke of the steering wheel or to be detachably mounted upon a supporting member. This plate is provided with interlocking members for engaging a reversible pad frame yieldably holding a plurality of index cards, the frame also being fitted with a pencil holder.

The invention is illustrated by way of example in the accompanying drawings, in which—

Figure 1 is a view in plan showing an automobile steering wheel and disclosing the pad carried upon the spoke thereof.

Fig. 2 is an enlarged view in plan showing the complete holder.

Fig. 3 is a view in transverse section through the holder as seen on the lines 3—3 of Fig. 2.

In the drawings, 10 indicates a steering wheel of common design and which is understood to be mounted upon an automobile. This wheel is formed with a plurality of radial spokes 11. Mounted upon one of these spokes is a combined index and memoranda pad holder 12, with which the present invention is concerned. This holder comprises a back plate 13 preferably formed at its opposite ends with tangs 14. These members are adapted to be folded around the spoke of the steering wheel and to rigidly hold this back plate in place. The back plate is substantially rectangular in shape and its upper edge is formed with a forwardly and downwardly turned lock-lip 15. This member does not extend entirely across the width of the plate but only a portion of the width so that a suitable locking action will be produced in combination with a flexible lock finger 16. The lock-finger is formed upon a diametrically opposite side from the lip and thus combines therewith to hold a reversible frame member 17 in position upon the plate. The finger 16 is preferably formed with an enlarged or flanged end as indicated at 18 for passing through and engaging a slot 19 in the central plate 20 of the frame.

Referring particularly to Fig. 3, it will be seen that the central plate 20 is of greater width than the back plate 13, and thus provides a flange by which the plate may be grasped and the frame reversed when desired. Mounted upon the opposite side of the plate are oppositely extending flange portions 21 and 22. These members extend completely across the upper edge of the plate 20 and partly down the opposite sides thereof. The length of the side extension is, of course, determined by the size of cord or index sheets, which it is adapted to accommodate. These sheets are indicated at 23 and will be seen to fit beneath the flange portion and to be yieldably held by means of leaf springs 24.

In order that a pencil will be at all times provided for use with the memoranda pad and the index sheets, a metal holder 25 is secured to one edge of the structure 17 and is adapted to receive a pencil 26.

In operation the back plate 13 is permanently secured to the hand wheel of the vehicle as previously described, after this has been done, the two sides of the holder 17 may be filled with cards, and thereafter the holder may be mounted upon the flange back plate, this is accomplished by first inserting the lip 15 of the back plate within one of the longitudinally extending slots 28 formed along the upper edge of the holder and as clearly indicated in Fig. 3. After the lip member has been seated within one of these slots, the spring finger 16 is forced through the opening 19 in the extension of the plate 20, thus acting to hold the plate in position and to rigidly secure one set of cards in a sliding position. When it is desired to use the set of cards upon the opposite side of the holder, the holding structure may be reversed in a manner which would be readily understood.

Due to this arrangement, it will be possible for one set of cards to be used as a card index and the other set to be used for making memoranda notes.

It will thus be seen that the device here disclosed, while simple in its construction will provide a convenient accessory for automobiles and supply physicians, tradesmen and persons of like character with a convenient reference index and also memoranda sheets for various purposes.

While I have shown the preferred form of my invention, as now known to me, it will be understood that various changes in the combination, construction and arrangement of parts may be made by those skilled in the art without departing from the spirit of the invention as claimed.

Having thus described my invention, what I claim and desire to secure by Letters Patent is:

1. In a device of the character described a holder comprising a central rectangular partition wall, flanges formed along three sides of each of the faces of said wall, spring members disposed beneath certain of the flanges for holding index cards in position, a fixed back plate for said holder and means upon the back plate for detachably engaging the holder to permit it to be reversibly held upon the plate.

2. In combination with a spoke of an automobile steering wheel, a memoranda pad holder comprising a back plate secured to said spoke and having a rigid hook-shaped fastening member along the upper marginal edge thereof, and a yieldable fastening member carried at the lower edge thereof, and a card holder formed with a central plate adapted to lie parallel with the back plate and having card compartments upon the opposite sides thereof, and means whereby said card holder may be detachably secured by fastening members of the back plate.

3. A memoranda pad holder comprising a flat back plate having a hook-shaped tang along its upper marginal edge, and a yieldable fastener disposed beneath its lower marginal edge, a pad holder comprising a flat plate of larger dimensions than the back plate to form a lower extension thereover, said plate being bound upon three sides by a flanged wall, beneath which memoranda pads may be secured, yieldable means disposed beneath the side portions of said wall for binding the pads in position, and means whereby the holder thus formed may be detachably secured in reverse positions to the back plate by the upper and lower fasteners thereof.

In testimony whereof I have hereunto set my hand in the presence of two subscribing witnesses.

LOUIS A. HUFSCHMIDT.

Witnesses:
JOHN H. HERRING,
THOMAS S. BURNES.